US009013712B2

(12) United States Patent
Park

(10) Patent No.: US 9,013,712 B2
(45) Date of Patent: Apr. 21, 2015

(54) DISPLAY APPARATUS

(75) Inventor: Yeon-Hee Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 122 days.

(21) Appl. No.: 13/609,194

(22) Filed: Sep. 10, 2012

(65) Prior Publication Data

US 2013/0307879 A1 Nov. 21, 2013

(30) Foreign Application Priority Data

May 17, 2012 (KR) ........................ 10-2012-0052597

(51) Int. Cl.
*G01B 11/24* (2006.01)
*G09G 3/34* (2006.01)

(52) U.S. Cl.
CPC .......... *G09G 3/3406* (2013.01); *G09G 2360/14* (2013.01); *G09G 2380/02* (2013.01)

(58) Field of Classification Search
None
See application file for complete search history.

(56) References Cited

U.S. PATENT DOCUMENTS

2005/0168675 A1* 8/2005 Yang ............................ 349/122
2009/0207124 A1* 8/2009 Park et al. ..................... 345/102
2010/0060548 A1* 3/2010 Choi et al. ..................... 345/1.3
2010/0141605 A1* 6/2010 Kang et al. .................... 345/174

FOREIGN PATENT DOCUMENTS

JP 2006-242986 A 9/2006
JP 2009-116863 A 5/2009
KR 1997-0031869 6/1997
KR 10-2010-0093187 A 8/2010
KR 10-2011-0089090 8/2011

OTHER PUBLICATIONS

Internet Material, Article About Galaxy Skin, Jul. 27, 2011; Address:http://android-fanatic.com; Title: The Flexible Samsung Phone.

KIPO Registration Determination Certificate, and the cited references, dated Aug. 29, 2013, for Korean priority Patent application 10-2012-0052597, 2 pages.

* cited by examiner

*Primary Examiner* — Nicholas Lee
*Assistant Examiner* — Duane N Taylor, Jr.
(74) *Attorney, Agent, or Firm* — Christie, Parker & Hale, LLP

(57) ABSTRACT

A display apparatus including a display panel for displaying image information and having edges, an edge-roll implementation unit at at least one edge of the display panel, the edge-roll implementation unit being configured to roll the at least one edge, a lighting unit at a surface of the at least one edge at which the edge-roll implementation unit is located, and a control unit for controlling the edge-roll implementation unit.

20 Claims, 5 Drawing Sheets

DISPLAY APPARATUS

CROSS-REFERENCE TO RELATED PATENT APPLICATION

This application claims priority to and the benefit of Korean Patent Application No. 10-2012-0052597, filed on May 17, 2012, in the Korean Intellectual Property Office, the disclosure of which is incorporated herein in its entirety by reference.

BACKGROUND

1. Field

Embodiments of the present invention relate to a display apparatus.

2. Description of the Related Art

Due to the rapid technological development in electronics and information industries, such as widespread integration of semiconductors and high speed circulation of information, and also due to user demand for high quality services, various electronics industries are being integrated, such as industries in the fields of home appliances, portable computers, and mobile devices, industries that have also been independently developed. Thus, recently, there has been much overlap between various electronics industries.

In line with this technological trend, flat display panels that have previously been applied to small-sized mobile devices are now being developed to be applied to large-sized electronic home appliances, such as TVs. In addition, technologies for satisfying various user demands, such as making a display apparatus capable of flexibly bending, are being developed.

SUMMARY

Embodiments of the present invention provide a display apparatus for providing users with a variety of aesthetic effects.

According to an aspect of embodiments of the present invention, there is provided a display apparatus including a display panel for displaying image information and having edges, an edge-roll implementation unit at at least one edge of the display panel, the edge-roll implementation unit being configured to roll the at least one edge, a lighting unit at a surface of the at least one edge at which the edge-roll implementation unit is located, and a control unit for controlling the edge-roll implementation unit.

The lighting unit may be at a back surface of the at least one edge.

The edge-roll implementation unit may include a plurality of edge-roll devices, and the control unit may be configured to independently control each of the edge-roll devices.

Each of the edge-roll devices may include a bimetal element.

The control unit may be configured to control voltages applied to the bimetal elements of the edge-roll devices to be different from one another.

The display apparatus may further include a light sensing unit for sensing light at a periphery of the display apparatus.

The control unit may be configured to control luminance of the lighting unit according to a sense signal of the light sensing unit.

The control unit may be configured to control the edge-roll implementation unit when no image is output by the display panel.

The control unit may be configured to control the edge-roll implementation unit when an off signal is received.

The display panel may include a flexible material.

The display panel may include a liquid crystal device or an organic light emitting device.

According to another aspect of embodiments of the present invention, there is provided a display apparatus including a display panel for displaying image information and having edges, an edge-roll implementation unit at at least one edge of the display panel for rolling the at least one edge, and a control unit for controlling the display panel and the edge-roll implementation unit.

The display apparatus may further include a lighting unit at a back surface of the at least one edge.

The display apparatus may further include a light sensing unit for sensing light at a periphery of the display apparatus.

The control unit may be configured to control luminance of the lighting unit according to a sense signal of the light sensing unit.

The control unit may be configured to perform a first off control for turning off a screen of the display panel, or to perform a second off control for turning off a driving of the display apparatus.

The control unit may be configured to control the edge-roll implementation unit to roll the at least one edge while performing the first off control.

The control unit may be configured to control the edge-roll implementation unit to unroll the at least one edge while performing the second off control after the first off control.

The edge-roll implementation unit may include a plurality of edge-roll devices, and the control unit may be configured to independently control each of the plurality of edge-roll devices.

Each of the edge-roll devices may include a bimetal element.

According to an exemplary embodiment of the present invention, by making at least one edge of a display panel capable of flexibly bending, rolling, and/or being used as a lighting unit, various aesthetic effects may be provided to a user using a display apparatus. Accordingly, the display apparatus may act ornamentally, or as a decorative feature of a room in which the display apparatus is located.

In addition, by selectively inducing a transformation of an edge of the display panel, it is possible to prevent the display apparatus from being damaged when its decorative function is not desired (e.g., when carrying the display apparatus).

BRIEF DESCRIPTION OF THE DRAWINGS

The above and other features and aspects of embodiments of the present invention will become more apparent by describing in detail exemplary embodiments thereof with reference to the attached drawings in which.

DETAILED DESCRIPTION

Figure 1:
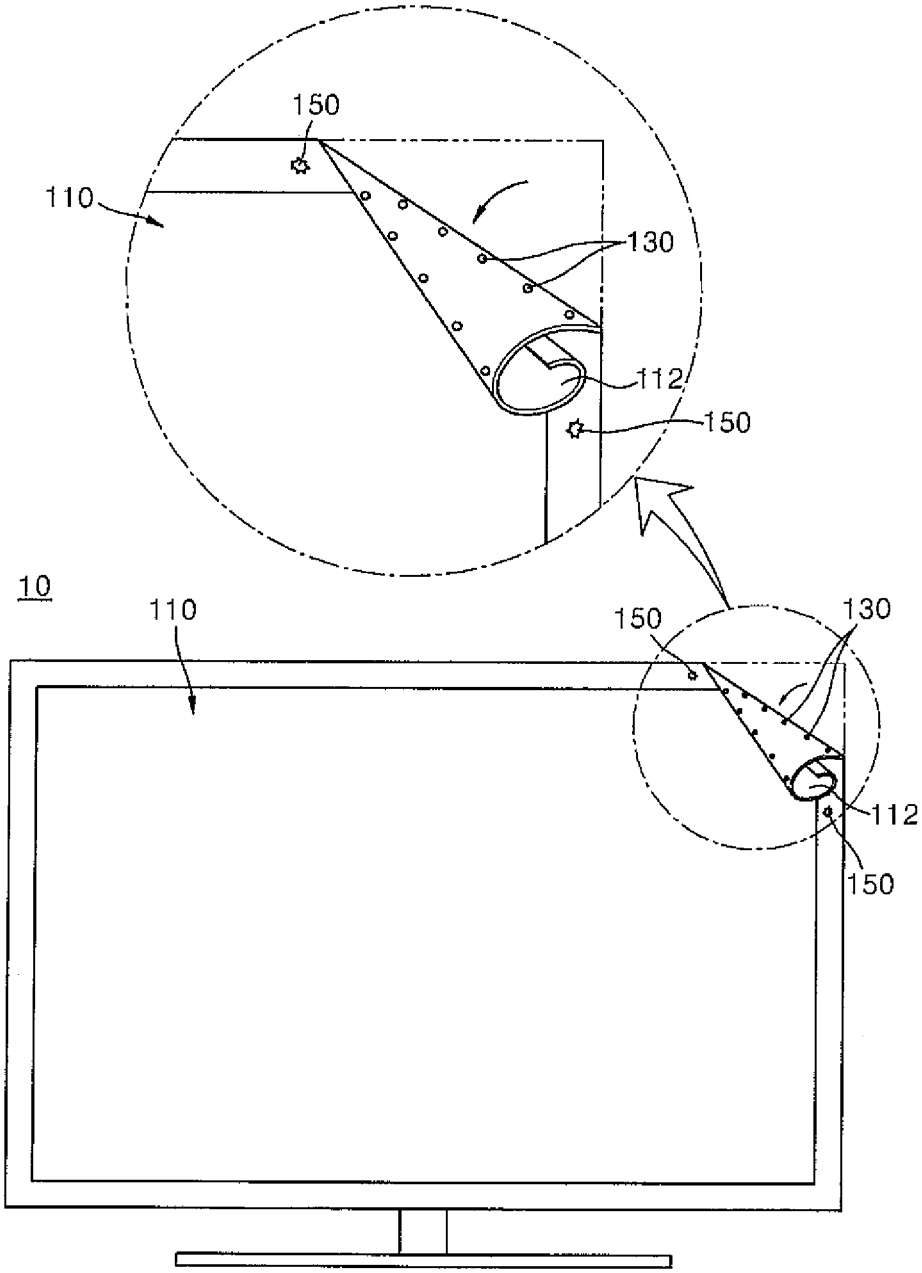
FIG. 1 is a schematic perspective view of a display apparatus according to an embodiment of the present invention.

As the embodiments of the present invention allow for various changes, particular embodiments will be illustrated in the drawings and described in detail in the written description. However, this is not intended to limit the present invention to particular modes of practice, and it will be appreciated that all changes, equivalents, and substitutes that do not depart from the spirit and technical scope of the present invention are encompassed in the present invention. In the description of embodiments of the present invention, certain detailed explanations of the related art are omitted when it is deemed that they may unnecessarily obscure the description of embodiments of the invention.

The terms used in the present specification are intended to describe particular embodiments, and are not intended to limit the present invention. An expression used in the singular encompasses the expression of the plural, unless the context clearly demonstrates otherwise. In the present specification, it is to be understood that terms such as "includes" or "including," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may also exist or may be added. While such terms as "first," "second," etc., may be used to describe various components, such components must not be limited to the above terms, which are used only to distinguish one component from another.

Figure 2:
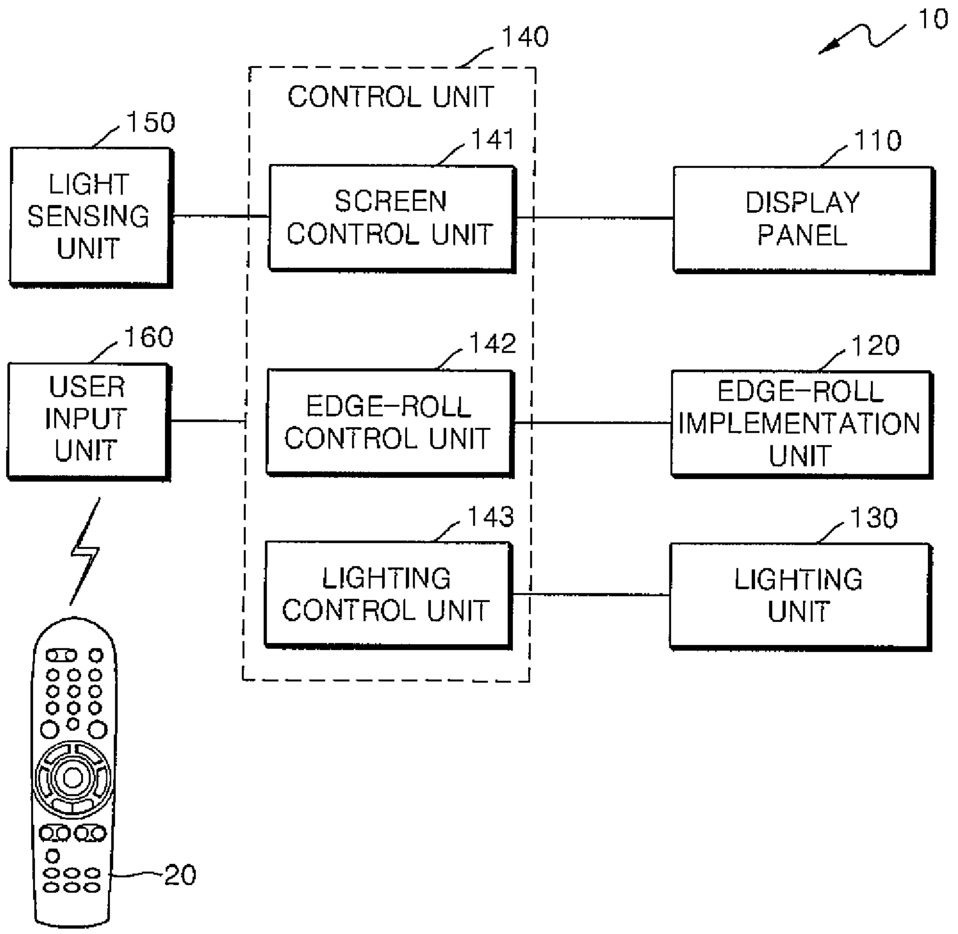
FIG. 2 is a schematic block diagram of the display apparatus of the embodiment shown in FIG. 1.

FIG. 1 is a schematic perspective view of a display apparatus 10 according to an embodiment of the present invention. FIG. 2 is a schematic block diagram of the display apparatus 10 of the embodiment shown in FIG. 1.

Referring to FIGS. 1 and 2, the display apparatus 10 includes a display panel 110, an edge-roll implementation unit 120, a lighting unit 130, a control unit 140, and a light sensing unit 150.

The display panel 110 may output image information through a front surface, may include a flexible material, and may be, for example, a liquid crystal device or an organic light emitting device. For example, the display panel 110 may be flexible organic light emitting diodes (OLEDs) or a flexible liquid crystal display (LCD).

The display panel 110 may include first and second long side edges that extend parallel to each other, and first and second short side edges that extend substantially perpendicular to the first and second long side edges. The display panel 110 may be manufactured in the form of a rectangle having four edges. The display panel 110 may output image information, such as a TV program or a movie.

At least one edge 112 of four edges of the display panel 110 of the present embodiment is rolled. For example, although the display panel 110 maintains the shape of a rectangle when outputting image information, the at least one edge 112 is rolled (e.g., automatically) according to an "off" command applied from the display apparatus 10, for example, an "off" command for stopping the output of image information through the display panel 110.

The edge-roll implementation unit 120 may be formed in the at least one edge 112 of four edges of the display panel 110. The edge-roll implementation unit 120 may include a plurality of edge-roll devices to roll the at least one edge 112 in which the edge-roll implementation unit 120 is formed. The edge-roll implementation unit 120 may be driven according to a control signal of the control unit 140 so that the edge 112 of the display panel 110 is rolled toward the front surface of the display apparatus 10. Driving of the edge-roll implementation unit 120 is described below with reference to FIGS. 3 and 4.

The lighting unit 130 may be formed in the at least one edge 112 in which the edge-roll implementation unit 120 is formed. For example, the lighting unit 130 may be formed on the back surface of the display panel 110, and may be exposed toward the front surface of the display apparatus 10 when the edge 112 of the display panel 110 is rolled toward the front surface according to the driving of the edge-roll implementation unit 120. The lighting unit 130 may include a plurality of light emitting diodes (LEDs) spaced apart from each other (e.g., spaced apart by a predetermined distance), and which may be turned on when the edge 112 of the display panel 110 is rolled toward the front surface by the edge-roll implementation unit 120. As the edge 112 of the display panel 110 is rolled and the plurality of LEDs are turned on, a variety of aesthetic effects may be provided to a user.

The light sensing unit 150 may sense brightness of the periphery of the display apparatus 10. For example, a photodiode, a phototransistor, a cadmium sulfide cell, or the like may be used as the light sensing unit 150. The light sensing unit 150 may operate during the driving of the lighting unit 130, and the luminance of the lighting unit 130 may be changed based on brightness sensed by the light sensing unit 150. Although, as shown in FIG. 1, the light sensing unit 150 of the present embodiment is located in an area of an edge of the display apparatus 10, the present invention is not limited thereto. In another embodiment of the present invention, the light sensing unit 150 may be located on the back surface of the display panel 110 together with the lighting unit 130.

The control unit 140 may perform an edge-roll function to roll the edge 112 of the display panel 110 toward the front surface. For example, if a user generates an "off" command through a remote controller 20, the "off" command received through a user input unit 160 may be transmitted to the control unit 140, and the control unit 140 may control the display apparatus 10, that is, may perform the edge-roll function. The control unit 140 may include a screen control unit 141, an edge-roll control unit 142, and a lighting control unit 143.

The screen control unit 141 may stop output or display of image information provided through the display unit 110 according to the "off" command. For example, the display panel 110 may be turned off by cutting off a power supply voltage applied to the display panel 110.

The edge-roll control unit 142 of the present embodiment may operate the edge-roll implementation unit 120 to roll the edge 112 of the display panel 110 according to the "off" command. For example, the edge-roll control unit 142 may control the extent to which the edge 112 of the display panel 110 is rolled by transmitting various control signals to the edge-roll implementation unit 120. At least a portion of the back of the display panel 110 may be exposed to a user while the edge 112 of the display panel 110 is rolled according to a control operation of the edge-roll control unit 142.

The lighting control unit 143 may control the lighting unit 130 attached on the one surface of the edge 112 of the display panel 110 (e.g., attached on the back side of the display panel 110). As the lighting control unit 143 controls the lighting unit 130 while the edge-roll control unit 142 controls the edge-roll implementation unit 120, aesthetic effects resulting from light, and resulting from a geometric shape in which the edge 112 of the display panel 110 has been rolled, may be provided to a user at the same time. For example, the lighting control unit 143 may provide various aesthetic effects through various controls, such as by sequentially providing the power supply voltage to the plurality of LEDs, or by providing the power supply voltage to only some of the plurality of LEDs.

The lighting control unit 143 may control the luminance of the lighting unit 130 based on a signal in the light sensing unit 150. For example, when a value obtained in the light sensing unit 150 is high, the lighting control unit 143 may increase the luminance of the lighting unit 130. Alternatively, when the periphery of the display apparatus 10 is dark, and the value obtained in the light sensing unit 150 is low, the lighting control unit 143 may reduce the luminance of the lighting unit 130 to provide dim illumination.

Below, a configuration and operation of the edge-roll implementation unit 120 is described in detail with reference to FIGS. 3 and 4.

Figure 3:
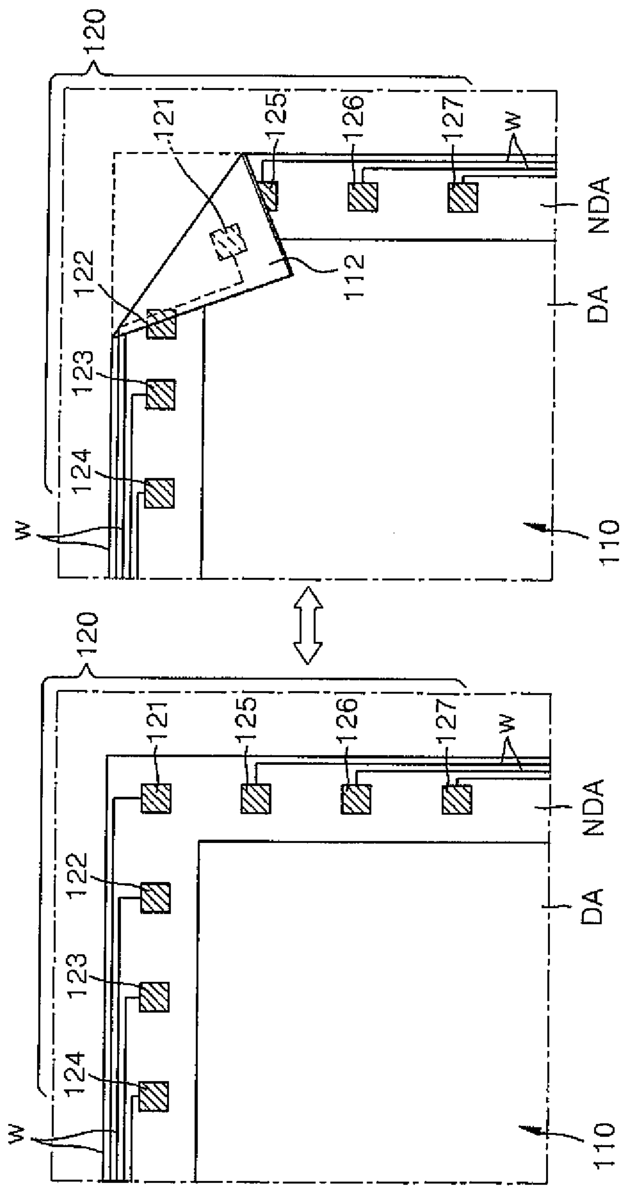
FIG. 3 is a diagram schematically illustrating a configuration of an edge-roll implementation unit, according to an embodiment of the present invention.
Figure 4:
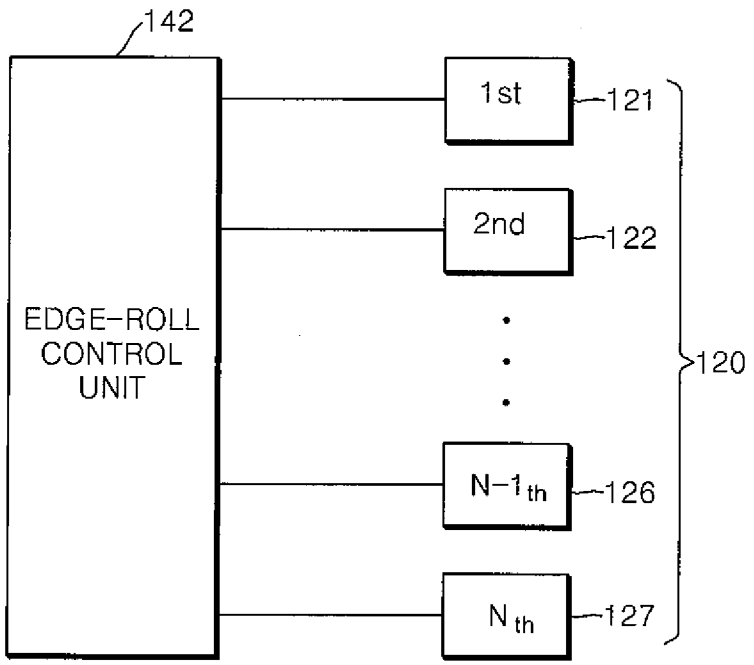
FIG. 4 is a block diagram illustrating the edge-roll implementation unit of the embodiment shown in FIG. 3 and an edge-roll control unit for operating the edge-roll implementation unit.

FIG. 3 is a diagram schematically illustrating a configuration of the edge-roll implementation unit 120, according to an embodiment of the present invention, and FIG. 4 is a block diagram illustrating the edge-roll implementation unit 120 of the embodiment shown in FIG. 3, and the edge-roll control unit 142 for operating the edge-roll implementation unit 120. In FIG. 3, the lighting unit 130 is omitted for convenience of explanation.

Referring to FIG. 3, the edge-roll implementation unit 120 may include a plurality of edge-roll devices, and the plurality of edge-roll devices may be, for example, a plurality of bimetal elements 121-127. The plurality of bimetal elements 121-127 may be spaced apart from each other in an edge portion 112 of the display panel 110. The plurality of bimetal elements 121-127 may be disposed in a non-screen area NDA disposed in the periphery of a screen area DA of the display panel 110. Conducting wires w for applying a power supply voltage are connected to the plurality of bimetal elements 121-127. Voltages that are applied to the plurality of bimetal elements 121-127, respectively, are determined by the edge-roll control unit 142, and the extent to which the edge 112 of the display unit 110 is rolled may be controlled by the edge-roll control unit 142.

Referring to FIG. 4, the edge-roll control unit 142 may individually control the voltages that are applied to the plurality of bimetal elements 121-127, respectively. The voltages that are applied to the plurality of bimetal elements 121-127, respectively, may be independently controlled, and the extent to which the edge 112 of the display unit 110 is rolled may be variously implemented by ensuring that the voltages, which are applied to the plurality of bimetal elements 121-127, are different from each other.

A rolled shape of the edge 112 of the display panel 110 may be implemented by differently controlling the extent of bending of the plurality of bimetal elements 121-127. Since the extent of bending of the plurality of bimetal elements 121-127 may vary due to heat that is generated in each of the plurality of bimetal elements 121-127, and because heat may vary due to changes in voltage, the edge-roll control unit 142 may variously control a rolled shape of the edge 112 by ensuring that the voltages, which are applied to the plurality of bimetal elements 121-127, are different from each other. For example, when applying the largest voltage to a first bimetal element 121 disposed in a pointed portion of the edge 112, it is possible to enlarge the extent to which the edge 112 corresponding to the first bimetal element 121 is rolled (e.g., bending may be increased, refer to FIG. 3).

The edge-roll control unit 142 may maintain a shape of the display panel 110 having an edge 112 that has been rolled (e.g., may maintain the shape for a predetermined time). For example, the edge-roll control unit 142 may maintain a rolled shape of the edge 112 by constantly maintaining voltages applied to the plurality of bimetal elements 121-127 after the edge 112 of the display panel 110 is rolled as stated above. After maintaining a rolled or bent shape of the display panel 110, the edge-roll control unit 142 may restore the edge of the display panel 110 to a flat shape by cutting off the voltages applied to the plurality of bimetal elements 121-127.

As another embodiment of the present invention, after the edge 112 of the display panel 110 is rolled, the edge-roll control unit 142 may variously change a rolled shape of the edge 112 of the display panel 110 by varying voltages applied to the bimetal elements 121-127.

A control operation for forming and maintaining a rolled shape of the edge 112 of the display panel 110 may be performed by the control unit 140 regardless of a type of "off" operation. For example, whenever a user generates, by using a remote controller 20, the "off" command for stopping output of image information through a screen of the display panel 110, the control unit 140 may perform edge-roll function.

As another embodiment of the present invention, a control operation of the control unit 140 may be changed according to the type of "off" command input through the remote controller 20 by a user. Below, the control operation of the control unit 140 based on the type of "off" command is described with reference to FIG. 5.

Figure 5:
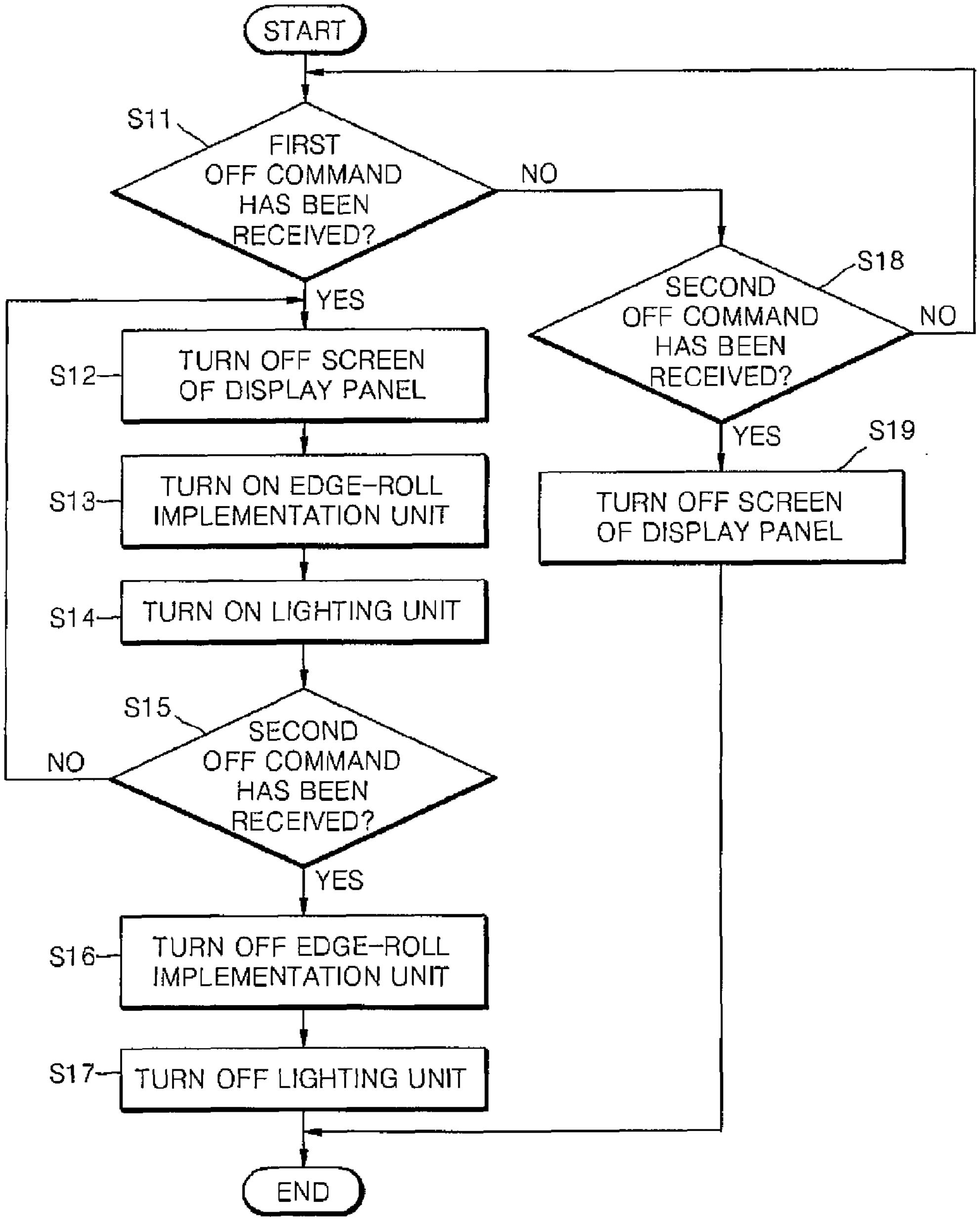
FIG. 5 is a flowchart schematically illustrating a method of driving the display apparatus of the embodiment shown in FIG. 1, according to an embodiment of the present invention.

FIG. 5 is a flowchart schematically illustrating a method of driving the display apparatus 10, according to an embodiment of the present invention. In more detail, FIG. 5 illustrates a method of controlling the control unit 140 based on the type of "off" command. In the current embodiment, the "off" command that is received by the control unit 140 may include a first "off" command and a second "off" command. The "off" command may be a signal input through the remote controller 20 by a user while image information is being output through the display panel 110, and is received by the control unit 140. The first "off" command is used for turning off the screen of the display panel 110, and the second "off" command is used for turning off driving of the display apparatus 10, as well as for turning off the screen of the display panel 110.

In operation S11, the first "off" command may be received. The first "off" command is a signal input through the remote controller 20 by a user, and is input to the control unit 140 (e.g., the edge-roll control unit 142) through the user input unit 160.

In operation S12, the screen of the display panel 110 is turned off according to the first "off" command. A power supply voltage that is supplied to a liquid crystal device or an organic light emitting device is cut off as the screen of the display panel 110 is turned off.

In operation S13, the edge-roll implementation unit 120 is driven. As described with reference to FIG. 3, the case where the edge-roll implementation unit 120 includes the plurality of bimetal elements 121-127 is described as follows. The control unit 140 may supply the power supply voltage to each of the plurality of bimetal elements 121-127 formed in the edge 112 of the display panel 110, and the plurality of bimetal elements 121-127 to which the power supply voltage has been applied are transformed. The edge 112 of the display panel 110 is rolled according to the transformation of the bimetal elements 121-127, and thus, an aesthetic effect due to geometric shape may be provided to a user. A rolled shape of the edge 112 of the display panel 110 may be maintained as the power supply voltage supplied to the bimetal elements 121-127 is constantly maintained. While the edge 112 of the display panel 110 is rolled, the lighting unit 130 at the back of the display panel 110 is exposed toward the front of the display panel 110.

In operation S14, the lighting unit 130 is driven. The control unit 140 drives the lighting unit 130 by supplying the power supply voltage to the lighting unit 130. When the lighting unit 130 includes a plurality of LEDs, the control unit 140 may provide various aesthetic effects through various controls, such as by sequentially providing the power supply voltage to the plurality of LEDs, providing the power supply voltage to only some of the plurality of LEDs, or repeating the supply and cutoff of the power supply voltage to the plurality of LEDs. As an example, as stated above, the control unit 140 may control the luminance of the lighting unit 130 based on a sense signal of the light sensing unit 150 while driving the lighting unit 130.

In operation S15, the second "off" command is received. The second "off" command is a signal input through the remote controller 20 by a user, and is input to the control unit 140, for example, the edge-roll control unit 142, through the user input unit 160. Since the second "off" command is for stopping the driving of the display apparatus 10 itself, the driving of the edge-roll implementation unit 120 and the lighting unit 130 driven according to the first "off" command is stopped by the second "off" command.

In operation S16, the driving of the edge-roll implementation unit 120 is turned off. As described with reference to FIG. 3, when the edge-roll implementation unit 120 includes the plurality of bimetal elements 121-127, the control unit 140 cuts off the power supply voltage that is provided to each of the bimetal elements 121-127 formed in the edge 112 of the display panel 110. As the power supply voltage is cut off, the transformed bimetal elements 121-127 are restored to a state prior to the transformation of the bimetal elements 121-127 in operation S13. Accordingly, the edge 112 of the display panel 110 is unrolled to be in a flat state according to the restoration of the bimetal elements 121-127, and the lighting unit 130 previously exposed toward the front of the display panel 110 faces the back of the display panel 110 again.

In operation S17, the driving of the lighting unit 130 is turned off. The control unit 140 cuts off the power supply voltage that is supplied to the lighting unit 130. The driving of the display panel 110, the driving of the edge-roll implementation unit 120, and the driving of the lighting unit 130 are stopped by operation S16 and operation S17. By having the edge 110 of the display panel 110 in a flat state through the control operations as described above, it is possible to prevent the edge 112 of the display panel 110 from being broken or damaged when carrying the display apparatus 10.

If it is determined that the first "off" command has not been received in operation S11, in operation S18, it is determined whether the second "off" command has been received. If the second "off" command has been received, the screen of the display panel 110 is turned off in operation S19. For example, the screen of the display panel 110 may be turned off by cutting off the power supply voltage that is supplied to the display panel 110 (e.g., the liquid crystal device or the organic light emitting device).

While embodiments of the present invention have been particularly shown and described with reference to exemplary embodiments thereof, it will be understood by those of ordinary skill in the art that various changes in form and details may be made therein without departing from the spirit and scope of the present invention as defined by the following claims, and their equivalents.

What is claimed is:

1. A display apparatus comprising:

a display panel for displaying image information and having edges;

an edge-roll implementation unit at, at least one edge of the display panel, the edge-roll implementation unit being configured to roll the at least one edge of the display panel;

a lighting unit at a surface of the at least one edge at which the edge-roll implementation unit is located; and a control unit configured to output a control signal to the edge-roll implementation unit to control the edge roll implementation unit to roll the at least one edge of the display panel.

2. The display apparatus of claim 1, wherein the lighting unit is at a back surface of the at least one edge and is configured to emit light in a direction opposite to a direction the image information is displayed with respect to the display panel.

3. The display apparatus of claim 1, wherein the edge-roll implementation unit comprises a plurality of edge-roll devices, and wherein the control unit is configured to independently control each of the edge-roll devices.

4. The display apparatus of claim 3, wherein each of the edge-roll devices comprises a bimetal element.

5. The display apparatus of claim 4, wherein the control unit is configured to control voltages applied to the bimetal elements of the edge-roll devices to be different from one another.

6. The display apparatus of claim 1, further comprising a light sensing unit for sensing light at a periphery of the display apparatus.

7. The display apparatus of claim 6, wherein the control unit is configured to control luminance of the lighting unit according to a sense signal of the light sensing unit.

8. The display apparatus of claim 1, wherein the control unit is configured to control the edge-roll implementation unit when no image is output by the display panel.

9. The display apparatus of claim 1, wherein the control unit is configured to control the edge-roll implementation unit when an off signal is received.

10. The display apparatus of claim 1, wherein the display panel comprises a flexible material.

11. The display apparatus of claim 1, wherein the display panel comprises a liquid crystal device or an organic light emitting device.

12. A display apparatus comprising:

a display panel for displaying image information and having edges;

an edge-roll implementation unit at, at least one edge of the display panel for rolling the at least one edge of the display panel; and a control unit for controlling the display panel and configured to output a control signal to the edge-roll implementation unit to control the edge roll implementation unit to roll the at least one edge of the display panel.

13. The display apparatus of claim 12, further comprising a lighting unit at a back surface of the at least one edge and is configured to emit light in a direction opposite to a direction the image information is displayed with respect to the display panel.

14. The display apparatus of claim 13, further comprising a light sensing unit for sensing light at a periphery of the display apparatus.

15. The display apparatus of claim 14, wherein the control unit is configured to control luminance of the lighting unit according to a sense signal of the light sensing unit.

16. The display apparatus of claim 13, wherein the control unit is configured to perform a first off control for turning off a screen of the display panel, or to perform a second off control for turning off a driving of the display apparatus.

17. The display apparatus of claim 16, wherein the control unit is configured to control the edge-roll implementation unit to roll the at least one edge while performing the first off control.

18. The display apparatus of claim 16, wherein the control unit is configured to control the edge-roll implementation unit to unroll the at least one edge while performing the second off control after the first off control.

19. The display apparatus of claim 13, wherein the edge-roll implementation unit comprises a plurality of edge-roll devices, and wherein the control unit is configured to independently control each of the plurality of edge-roll devices.

20. The display apparatus of claim 19, wherein each of the edge-roll devices comprises a bimetal element.

* * * * *